Figure 1:
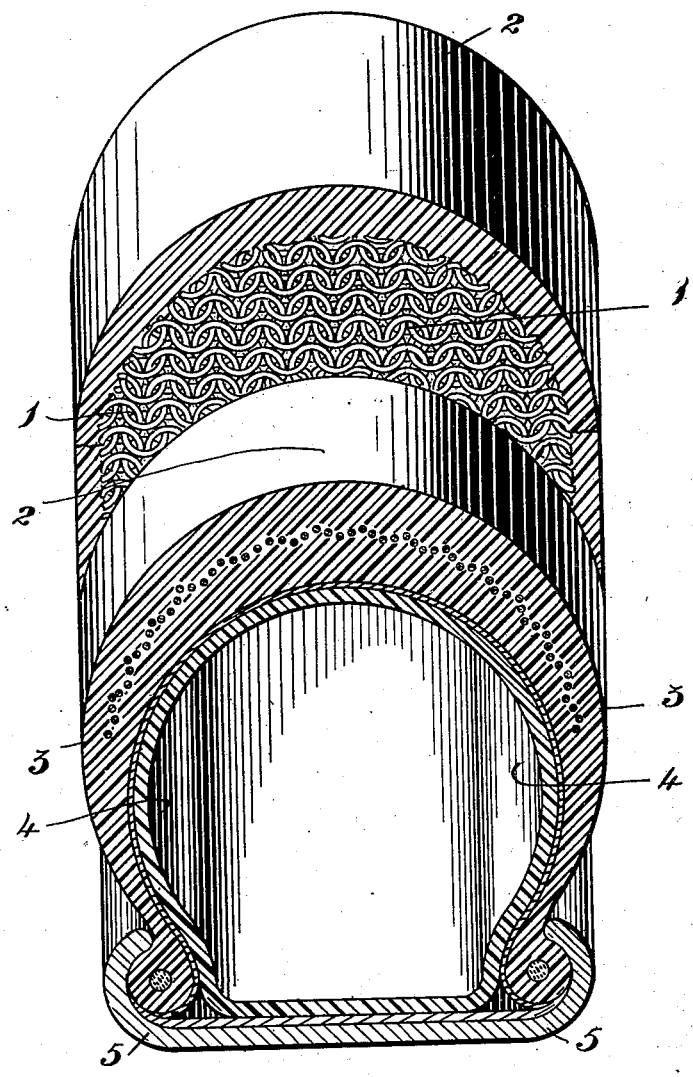

No. 722,600. PATENTED MAR. 10, 1903.
E. MIDGLEY.
PNEUMATIC TIRE.
APPLICATION FILED MAY 9, 1902.
NO MODEL. 3 SHEETS—SHEET 1.

Witnesses:
Dennis Sumby,
J. B. Keefer.

Inventor
Edwin Midgley
By James L. Norris.
Atty.

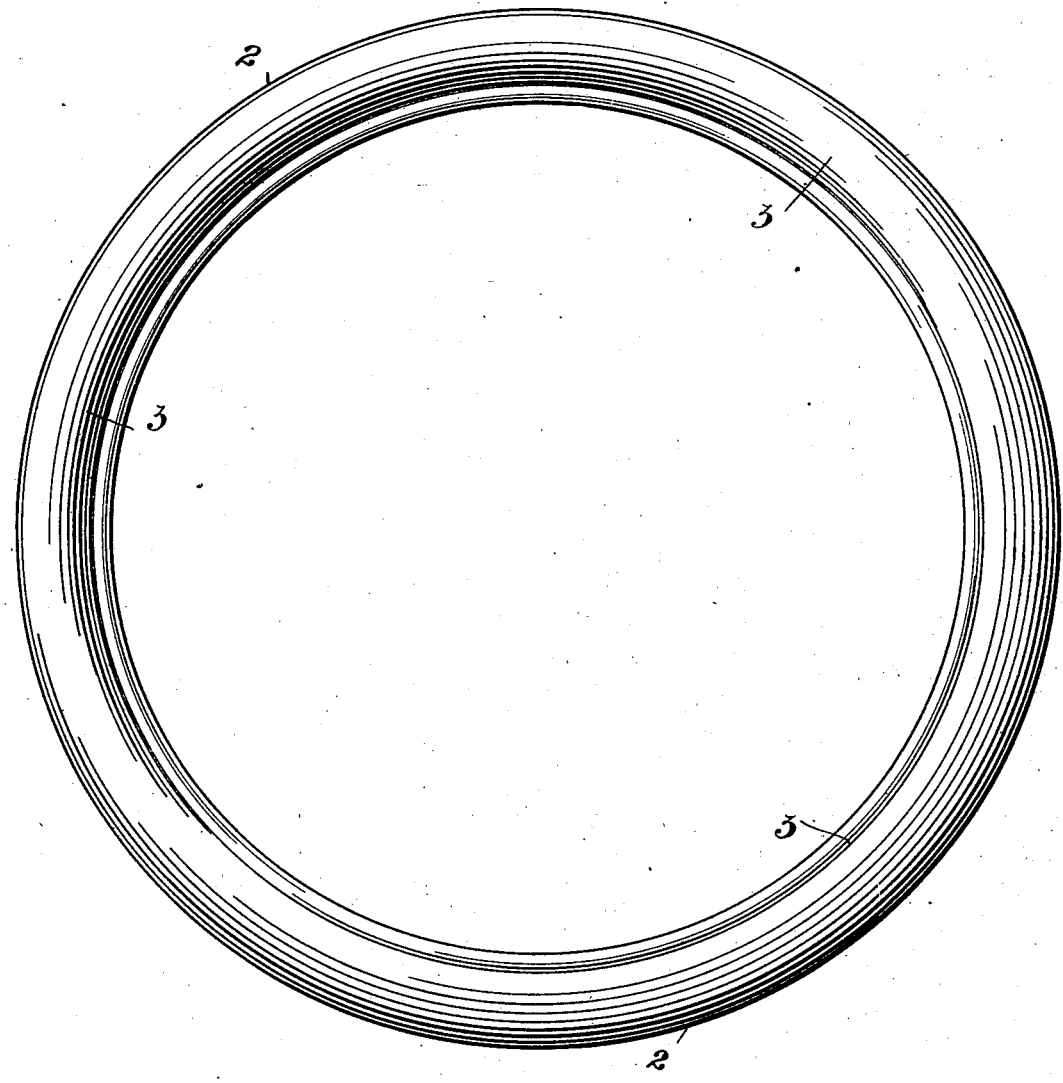

No. 722,600. PATENTED MAR. 10, 1903.
E. MIDGLEY.
PNEUMATIC TIRE.
APPLICATION FILED MAY 9, 1902.
NO MODEL. 3 SHEETS—SHEET 3.
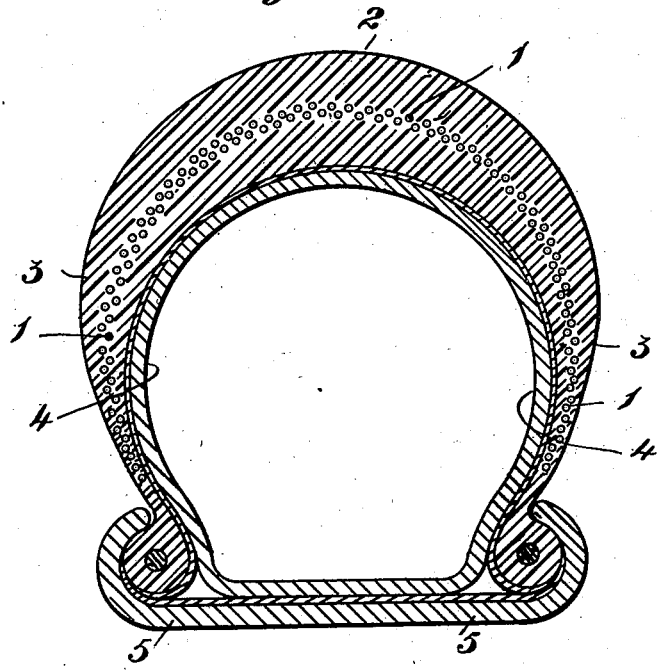
Witnesses:
Inventor
Edwin Midgley
By
James L. Norris.
Atty.

UNITED STATES PATENT OFFICE.

EDWIN MIDGLEY, OF LONDON, ENGLAND.

PNEUMATIC TIRE.

SPECIFICATION forming part of Letters Patent No. 722,600, dated March 10, 1903.

Application filed May 9, 1902. Serial No. 106,641. (No model.)

*To all whom it may concern:*

Be it known that I, EDWIN MIDGLEY, a subject of the King of Great Britain, residing at 38 Hyde Park Gate, London, England, have invented certain new and useful Improvements in Pneumatic Tires, of which the following is a specification.

The object of this invention is to construct a pneumatic-tire cover, especially those used with motor-cars, of such a character as to render same impregnable and prevent the inner tube being damaged, the feature being the combining with the body of rubber of the covering of a strip of chain mail or armor in such a manner that the links are so placed as to nearly close upon themselves, and the rubber surrounding the links has stretching action with each side of the links by the rubber molding itself in and around the links, thus insuring perfect resiliency of the cover and an efficient means of preventing punctures of the inner tube, the method of combining the rubber of the outer cover and the links of the chain, armor, or mail being such that it is impossible for the finest-pointed instrument to pass between the links.

My invention will be clearly understood from the following description, aided by the accompanying drawings, in which—

Figure 1 is a perspective elevation of a portion of a tire and rim, part being in section and part being broken away to clearly show my invention. Fig. 2 is an elevation of a wheel rim and tire. Fig. 3 is a section of a tire in which the chain-armor is carried right around the cover.

For the purpose of my invention I embed chain-mail 1 within the tread portion 2 of the cover 3 of a pneumatic tire, the chain-mail 1 being situate at a position within the thickness of the cover 3 that a layer of rubber shall be upon either side of the chain-mail 1. By this means a complete protection is given to the inner tube from any cutting or puncturing of the outer cover in its contact with the road. The chain-mail while being firmly embedded in the india-rubber is laid in a loose fashion—that is to say, it is not stretched—so that each link or ring will be practically free of its neighbor. This looseness will allow of the cover giving and being sharply indented due to passage over sharp or pointed stones or the like during traveling and insure perfect resiliency of the tire. The links or rings forming the mail being free of each other, any such indentation of the cover will not disturb the position of the many rings embedded in the india-rubber. Thus it will be seen that it is impossible for even a tack or small nail to enter between the links, because it would always come in contact with one or other of the links and will then be met by side pressure of the rubber which is between the links and jam it, thus preventing it going farther. The thickness of the india-rubber on each side of the chain-mail 1 I prefer to be equal, and the thickness is determined by the weight of the vehicle to which such a tire is to be fitted.

I have shown the tire-cover 3 and air-tube 4 as applied to a metal rim 5; but this is only for the purpose of illustrating my invention, as any form of rim 5 may be employed, as also any means of fastening the cover 3 to the rim.

When the tread of the outer cover has been worn down to the chain-mail, a new tread or band may be fixed on the tire or not, as desired.

What I claim, and desire to secure by Letters Patent, is—

A pneumatic tire comprising in its construction a rubber tread portion, and a strip of links loosely connected together and embedded in said tread portion so as to be engaged and entirely surrounded by the rubber forming the tread portion.

In testimony whereof I have hereunto set my hand in presence of two subscribing witnesses.

EDWIN MIDGLEY.

Witnesses:
WM. O. BROWN,
HUGH HUGHES.